Figure 1:
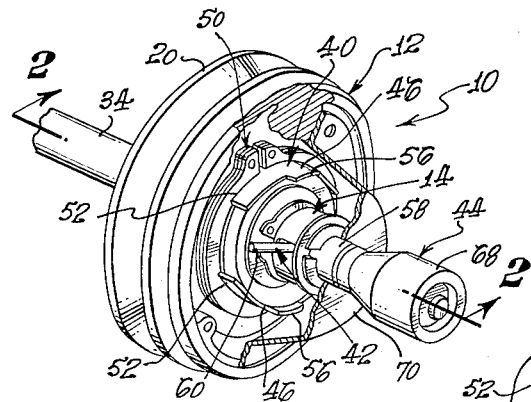

June 13, 1961

W. DOBLE 2,988,187

CLUTCH

Filed May 25, 1959

WARREN DOBLE,
INVENTOR.

By His Attorneys

HARRIS, KIECH, RUSSELL & KERN.

United States Patent Office
2,988,187
Patented June 13, 1961

2,988,187
CLUTCH
Warren Doble, North Hollywood, Calif., assignor to Jabsco Pump Company, Costa Mesa, Calif., a corporation of California
Filed May 25, 1959, Ser. No. 815,603
4 Claims. (Cl. 192—48)

The present invention relates in general to clutches and, more particularly, to a clutch of the dog or jaw type, a general object of the invention being to provide a clutch of this character which is capable of being engaged with a minimum of shock, which is completely enclosed, which is simple to operate, which is compact so that it occupies a minimum of space, and the various parts of which may be made and assembled economically so as to minimize manufacturing costs.

The present invention constitutes various improvements on the clutches disclosed in copending applications Serial No. 678,950, filed August 19, 1957, and Serial No. 751,-492, filed July 28, 1958, both filed jointly by Frank H. Sully and me.

As general background, the invention contemplates a clutch which includes coaxial driving and driven rotary members respectively carrying interengageable clutch means and which includes actuating means for moving one of the clutch means axially relative to the rotary member by which it is carried into and out of engagement with the other clutch means. The invention provides for circumferential slippage between one of the clutch means and the rotary member by which it is carried so as to minimize shock upon engagement of the two clutch means, the clutch means which is capable of circumferential slippage comprising generally annular shoe means biased into frictional engagement with the corresponding rotary member by a suitable spring means. In the preferred construction, the clutch means which includes the shoe means mentioned is axially immovable relative to its rotary member and is engageable and disenageable by the axially movable clutch means. The shoe means carries dogs or jaws which are engageable and disengageable by dogs or jaws of the axially movable clutch means, the dogs or jaws of the latter clutch means preferably being the ends of a diametral pin connected to the actuating means. Preferably, the diametral pin of the axially movable clutch means is a spring pin capable of flexing somewhat upon engagement of the ends thereof with the respective jaws on the shoe means to supplement the action of the slipping shoe means in absorbing shock. The two clutch means are completely enclosed by a generally cup-shaped cover which is mounted on one of the rotary members and through which the actuating means for the axially movable clutch means extends.

As further background, the shoe means of the slipping clutch means comprises two generally semiannular shoes which are held in frictional engagement with the corresponding rotary member by the spring means mentioned and which respectively have thereon the dogs or jaws engageable by the ends of the diametral pin of the axially movable clutch means. The two shoes are spaced apart circumferentially at least slightly so that they can slip circumferentially relative to each other to compensate for any deviation in the circumferential spacing of the ends of the diametral pin from 180°, or any deviation in the circumferential spacing of the dogs or jaws on the shoes from 180°. Thus, uniform engagement between the ends of the diametral pin and the dogs or jaws on the shoes is assured despite errors in manufacture and assembly.

A primary object of the invention is to provide in a clutch of the foregoing nature shoes having a unique construction which permits them to be manufactured economically and which permits quick and easy assembly of the shoes with the rotary member by which they are carried and with the spring means for maintaining them in frictional engagement with such rotary member.

More particularly, an important object of the invention is to provide shoes which are simply formed of sheet metal, as by a stamping operation, or the like.

Still more particularly, an important object of the invention is to provide arcuate shoes having inwardly struck portions receivable in an annular groove in the corresponding rotary member to key the shoes against axial movement relative to such rotary member, and having axially spaced, outwardly struck portions adapted to receive therebetween and to retain an annular spring means for maintaining the shoes in frictional engagement with the rotary member in question.

Another object is to provide arcuate shoes wherein the inwardly and outwardly struck portions mentioned comprise inwardly and outwardly struck tongues at the ends of the shoes, there being at each end of each shoe an inwardly struck tongue receivable in the annular groove mentioned and a pair of outwardly struck tongues disposed on opposite sides of the corresponding inwardly struck tongue and adapted to receive therebetween the annular spring means mentioned.

Another object is to provide a construction wherein the annular spring means for maintaining the shoes in frictional engagement with the corresponding rotary member is merely a snap ring, or a group of snap rings.

Figure 3:
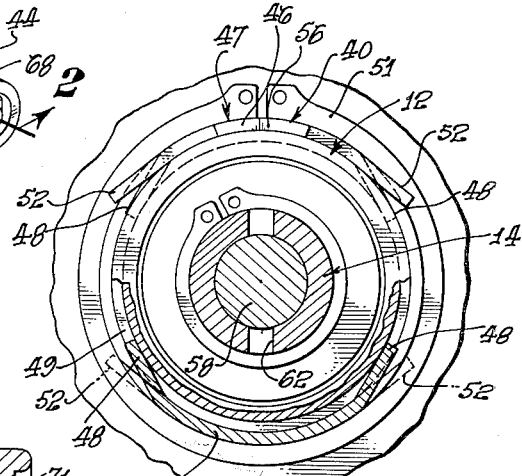
Figure 2:
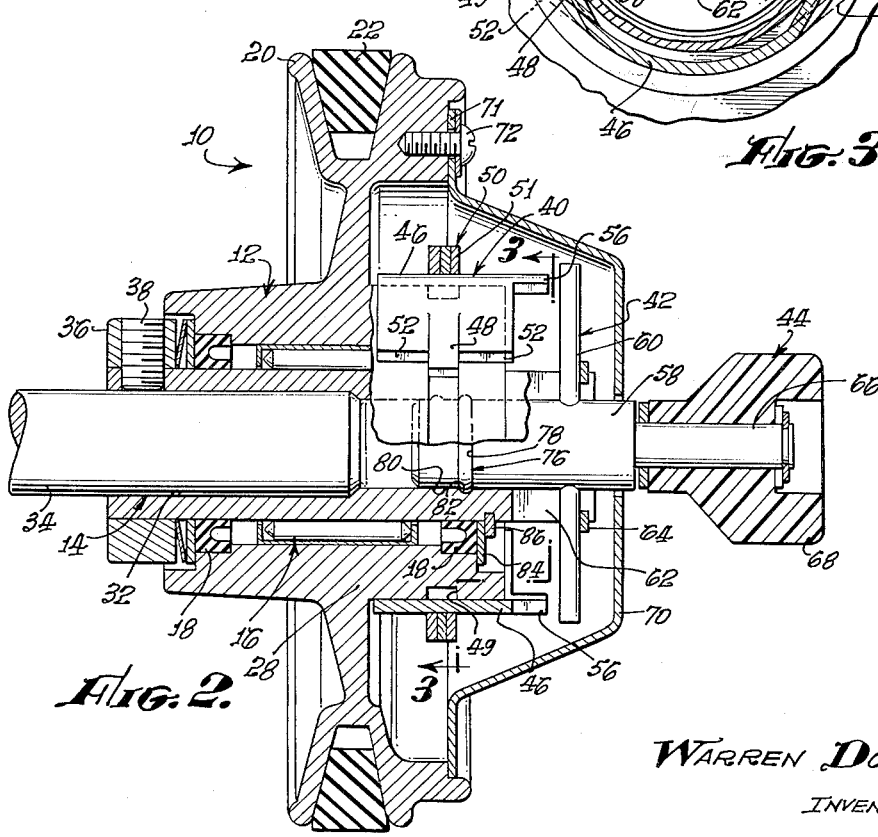

The foregoing objects, advantages, features and results of the present invention, together with various other objects, advantages, features and results thereof which will be evident to those skilled in the clutch art in the light of this disclosure, may be attained with the exemplary embodiment of the invention described in detail hereinafter and illustrated in the accompanying drawing, in which:

FIG. 1 is a perspective view of a clutch which embodies the invention;

FIG. 2 is an enlarged, longitudinal sectional view of the clutch of FIG. 1 taken in the plane of the arrowed line 2—2 of FIG. 1, some components of the clutch being shown in elevation; and FIG. 3 is a transverse sectional view of the clutch of FIGS. 1 and 2 taken along the arrowed line 3—3 of FIG. 2.

The clutch illustrated in the drawing is designated generally by the numeral 10 and is shown as including coaxial outer and inner rotary members 12 and 14, the outer rotary member 12 being regarded as a driving member herein and the inner rotary member 14 being regarded as a driven member. The driving member 12 is rotatably mounted on the driven member 14 by means of a bearing 16 of any suitable type disposed therebetween, suitable seals 18 being provided between the driving and driven members at the respective ends of the bearing to enclose the latter.

In the construction illustrated, the driving member 12 includes a pulley 20 having a V-belt 22 trained therearound. The V-belt 22 may be driven by any suitable power source, not shown, such as the engine of a boat, for example. As will be apparent, the driving member 12 is driven continuously through the pulley 20 and the V-belt 22 as long as the power source which drives the V-belt is operating.

The pulley 20 is provided with a hub 28 forming part of the driving member 12 and separated from the driven member 14 by the bearing 16 and the seals 18. The driven member 14 is provided with an axial bore 32 in one end of which is disposed a shaft 34 to be driven by the clutch 10. This shaft may, for example, be the shaft of a bilge pump, not shown, of a boat. The driven member 14 has thereon a collar 36 carrying a set screw 38 for transmitting rotation between the driven member and the shaft 34, although again the shaft and the driven member may be keyed together in other ways.

The driving member 12 carries a clutch means 40 which is engageable by a complementary clutch means 42 carried by the driven member 14 to transmit rotation of the driving member 12 to the driven member 14, the clutch means 42 being axially movable into and out of engagement with the clutch means 40 by an actuating means 44. The clutch means 42 is shown in its disengaged position in FIG. 2.

Considering the clutch means 40 on the driving member 12, it is shown as including two circumferentially spaced, diametrically opposite, arcuate shoes 46 which may be regarded as generally semiannular and which, together, form a generally annular shoe means 47 encircling the hub 28 of the pulley 20. The shoes 46 are preferably formed of sheet metal by a stamping operation, or a similar operation, and are provided at their ends and intermediate their edges with inwardly struck tongues 48 disposed in an external annular groove 49 in the hub 28. Providing the shoes 46 with the inwardly struck tongues 48 in the external annular groove 49 in the hub 28 permits relative rotation between the driving member 12 and the shoes 46, but prevents relative axial movement therebetween.

The shoes 46 are biased into frictional engagement with the hub 28 of the driving member 12 by an annular spring means 50 which, in the particular construction illustrated, consists of one or more snap rings 51, the number of snap rings employed depending on the force required to bias the shoes into frictional engagement with the hub 28. As will be explained in more detail hereinafter, the spring force biasing the shoes 46 into frictional engagement with the hub 28 is so selected as to permit slippage of the shoes relative to the hub 28 upon engagement of the clutch means 40 and 42 to minimize the shock resulting from such engagement.

The annular spring means 50 is retained on the shoes 46 by providing the shoes at their ends with axially spaced, outwardly struck tongues 52, the outwardly struck tongues at each end of each shoe being disposed on opposite sides of the corresponding inwardly struck tongue 48 and receiving the annular spring means 50 therebetween to key the spring means and the shoes together against relative axial movement.

The clutch means 40 further includes two diametrically opposed dogs or jaws 56 which are formed integrally with and which extend axially from the shoes 46, respectively. These jaws are engageable with the movable clutch means 42 on the driven member 14 when the movable clutch means is in its engaged position, as described hereinafter.

The foregoing construction for the shoes 46 is an important feature of the invention since it provides a very simple and economical means of keying the shoes against axial movement relative to the hub 28 and of keying the annular spring means 50 against axial movement relative to the shoes. As will be apparent, by forming the shoes of sheet metal in a stamping operation, or the like, the desired keying means can be obtained very simply and cheaply. Considering the movable clutch means 42 and the actuating means 44 in more detail, the latter includes an actuator 48 disposed in and movable axially of the bore 32 in the driven member 14, the actuator being disposed in the opposite end of the bore 32 from the shaft 34. The movable clutch means 42 consists of a diametral drive pin, preferably a spring pin, 60 which extends through the actuator 58 and projects radially therefrom on opposite sides thereof. The length of the drive pin 60 is such that the ends thereof are respectively engageable with diametrically opposite sides of the jaws 56, thereby transmitting rotation of the driving member 12 to the drive pin 60 and the actuator 58. Such engagement between the drive pin 60 and the jaws 56 occurs when the actuator 58 is in an engaged position to the left of that shown in FIG. 2. When the actuator 58 is in a disengaged position, shown in solid lines in FIG. 2, the ends of the drive pin 60 clear the jaws 56, i.e., are spaced axially from the jaws, to prevent engagement of the drive pin and the jaws. The drive pin 60, preferably being a spring, flexes somewhat upon engagement of the ends thereof with the respective jaws 56 to supplement the shock absorbing action resulting from slippage of the shoes 46 relative to the hub 28.

In order to transmit rotation between the drive pin 60 and the driven member 14, the drive pin is disposed in and movable axially of a diametral, axially extending slot 62 in one end of the driven member 14. As will be apparent, the drive pin 60 engages the walls of the slot 62 to transmit rotation of the drive pin to the driven member 14. Thus, the drive pin performs the dual function of acting as the clutch means 42 and of providing a keyed, axially slidable connection to the driven member 14. Withdrawal of the drive pin 60 from the slot 62, and, consequently, withdrawal of the actuator 58 from the bore 32, are prevented by a snap ring 64 which encircles the driven member 14 and closes the outer end of the slot.

Considering the manner in which the actuator 58 is moved between its engaged and disengaged positions to move the drive pin 60 into and out of engagement with the jaws 56, the actuator is provided with an axially outwardly extending stem 66 which has an actuating knob 68 rotatably mounted thereon. As will be apparent, the actuator may be moved between its engaged and disengaged positions by pushing inwardly and pulling outwardly on the actuating knob 68.

For safety reasons, and to protect these parts, the drive pin 60 and the jaws 56 are enclosed by a cover in the form of a cup 70 through the base of which the actuator 58 extends. The cup 70 is provided with an annular rim or flange 71 concentric with and seated against the pulley 20 and suitably connected thereto, as by screws 72. The cup 70 thus rotates with the driving member 12. If desired, a suitable seal, not shown, may be disposed between the base of the cup 70 and the actuator 58.

In order to definitely locate the engaged and disengaged positions of the actuator 58 and the drive pin 60, a spring detent means 76 engaging the actuator and the driven member 14 and adapted to releasably lock the actuator in either its engaged position or its disengaged position is provided. The spring detent means 76 comprises an annular coil spring disposed in an external annular groove 78 in the actuator 58 and insertable into either of two internal annular grooves 80 and 82 in the driven member 14. The groove 80 corresponds to the engaged position while the groove 82 corresponds to the disengaged position.

Any tendency of the axial forces applied to the actuator knob 68 to produce relative axial movement of the driving and driven members 12 and 14 is prevented by disposing the hub 28 of the driving member 12 between the collar 36 on the driven member 14 and a washer 84 which encircles the driven member 14 at the opposite end of the hub 28 from the head 36 and which is retained by a snap ring 86.

Considering the operation of the clutch 10 of the invention, it will be apparent that when the actuator 58 is in its disengaged position, as shown in solid lines in FIG. 2 of the drawing, the driving member 12 may rotate freely without transmitting rotation to the driven member 14 since the drive pin 60 is in a position such that it is cleared by the jaws 56 as they rotate. In order to engage the clutch 10, the operator merely presses inwardly on the actuator knob 68. This results in radial compression of the detent spring 76 sufficient to permit movement thereof from the annular groove 82 to the annular groove 80, whereupon this spring expands radially to releasably lock the actuator in its engaged position. As the actuator 58 is moved into its engaged position in this manner, the drive pin 60 is moved axially into a position wherein the ends thereof are engageable by the respective jaws 56. When the rotating jaws 56 strike the ends of the drive pin 60, the frictional engagement between the shoes 46 and the hub 28 resulting from the inward biasing action of the snap rings 51 on the shoes permits slippage of the shoes relative to the hub 28 until the driven member 14, the shaft 34 and the apparatus driven by the shaft are brought up to speed. Such slippage may occur throughout anywhere from a fraction of a revolution to several revolutions of the pulley 20 and greatly minimizes the shock which would otherwise result from engagement of the jaws 56 with the ends of the drive pin 60, which is an important feature. Since the drive pin is an elastic member, as hereinbefore discussed, it also flexes somewhat as the ends thereof are struck by the jaws 56. This flexure of the drive pin 60 upon engagement by the jaws 56 also reduces the shock incident to engagement of the jaws and the drive pin.

Disengagement of the clutch 10 to interrupt rotation transmission between the driving member 12 and the driven member 14 is achieved merely by pulling outwardly on the actuating knob 68 to disengage the drive pin 60 from the jaws 56, the detent spring 76 moving from the groove 80 to the groove 82 as this occurs. It is thought that the manner in which disengagement of the clutch 10 occurs will be apparent so that a further discussion is not necessary.

It should be pointed out that spacing the shoes 46 apart circumferentially permits relative circumferential movement thereof if one end of the drive pin 60 tends to engage one of the jaws 56 before the other end of the drive pin engages the other of such jaws. Consequently, the drive pin 60 engages both jaws 56 uniformly despite errors in manufacture and/or assembly which tend to prevent simultaneous engagement of the ends of the drive pin with the jaws 56. For example, if the drive pin 60 is not quite diametrically positioned so that its ends are not spaced apart exactly 180°, or if the jaws 56 are not spaced apart exactly 180°, one shoe 46 slips relative to the other until uniform engagement of the drive pin 60 with the jaws 56 is attained. Such uniform engagement is an important feature since it prevents unbalanced loads on the drive pin 60, prevents binding of the actuator 58, and the like.

It should also be pointed out that the detent spring 76 plays an important function in that a relatively large push force must be applied to the actuating knob 68 to compress the detent spring sufficiently to permit its withdrawal from the groove 82. Because of this relatively large push force, the actuator 58 moves all the way from its disengaged position to its engaged position as soon as the spring detent 76 leaves the groove 82. Consequently, the drive pin 60 moves rapidly into full engagement with the jaws 56 to prevent the chattering of the jaws against the drive pin which might result were the drive pin moved into the engaged position slowly.

The invention thus provides a simple, compact and inexpensive clutch which greatly minimizes the shock incident to engagement thereof and the operating parts of which are fully enclosed.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In a clutch, the combination of: coaxial driving and driven rotary members one of which is provided with an external annular groove therein intermediate its ends; two interengageable clutch means respectively carried by said rotary members, one of said clutch means being movable axially relative to the rotary member by which it is carried into engagement with the other of said clutch means, one of said clutch means comprising circumferentially arranged sheet metal shoes circumferentially slidable relative to and frictionally engageable with said one rotary member, said shoes having inwardly bent portions disposed in said annular groove and having axially spaced, outwardly bent portions on axially opposite sides of each of said inwardly bent portions; annular spring means encircling said shoes and disposed between said outwardly bent portions of each pair thereof and biasing said shoes into frictional engagement with said one rotary member; and actuating means operatively connected to said movable clutch means for moving said movable clutch means axially into engagement with the other of said clutch means.

2. In a clutch, the combination of: coaxial driving and driven rotary members one of which is provided with an external annular groove therein intermediate its ends; two interengageable clutch means respectively carried by said rotary members, one of said clutch means being movable axially relative to the rotary member by which it is carried into engagement with the other of said clutch means, one of said clutch means comprising circumferentially spaced sheet metal shoes circumferentially slidable relative to and frictionally engageable with said one rotary member, each of said shoes having at each end thereof an inwardly bent tongue disposed in said annular groove, and each of said shoes having at each end thereof two outwardly bent tongues respectively disposed on axially opposite sides of the corresponding inwardly bent tongue; annular spring means encircling said shoes and disposed between said outwardly bent tongues at each end of each of said shoes and biasing said shoes into frictional engagement with said one rotary member; and actuating means operatively connected to said movable clutch means for moving said movable clutch means axially into engagement with the other of said clutch means.

3. A clutch according to claim 2 wherein each of said shoes has a jaw projecting from one edge thereof, said movable clutch means having portions respectively engageable with said jaws on said shoes.

4. In combination: a rotary member having an annular groove therein intermediate its ends; circumferentially arranged sheet metal shoes frictionally engaging said rotary member and having portions bent radially in one direction and disposed in said annular groove and having axially spaced portions bent radially in the opposite direction on axially opposite sides of each of the radially bent portions first mentioned; and annular spring means disposed between said axially spaced, radially bent portions of each pair thereof and biasing said shoes into frictional engagement with said rotary member.

References Cited in the file of this patent

UNITED STATES PATENTS

| | | |
|---|---|---|
| 1,374,034 | Scott | Apr. 5, 1921 |
| 1,746,764 | Carhart | Feb. 11, 1930 |
| 2,816,638 | Campbell | Dec. 17, 1957 |